Patented Jan. 25, 1949

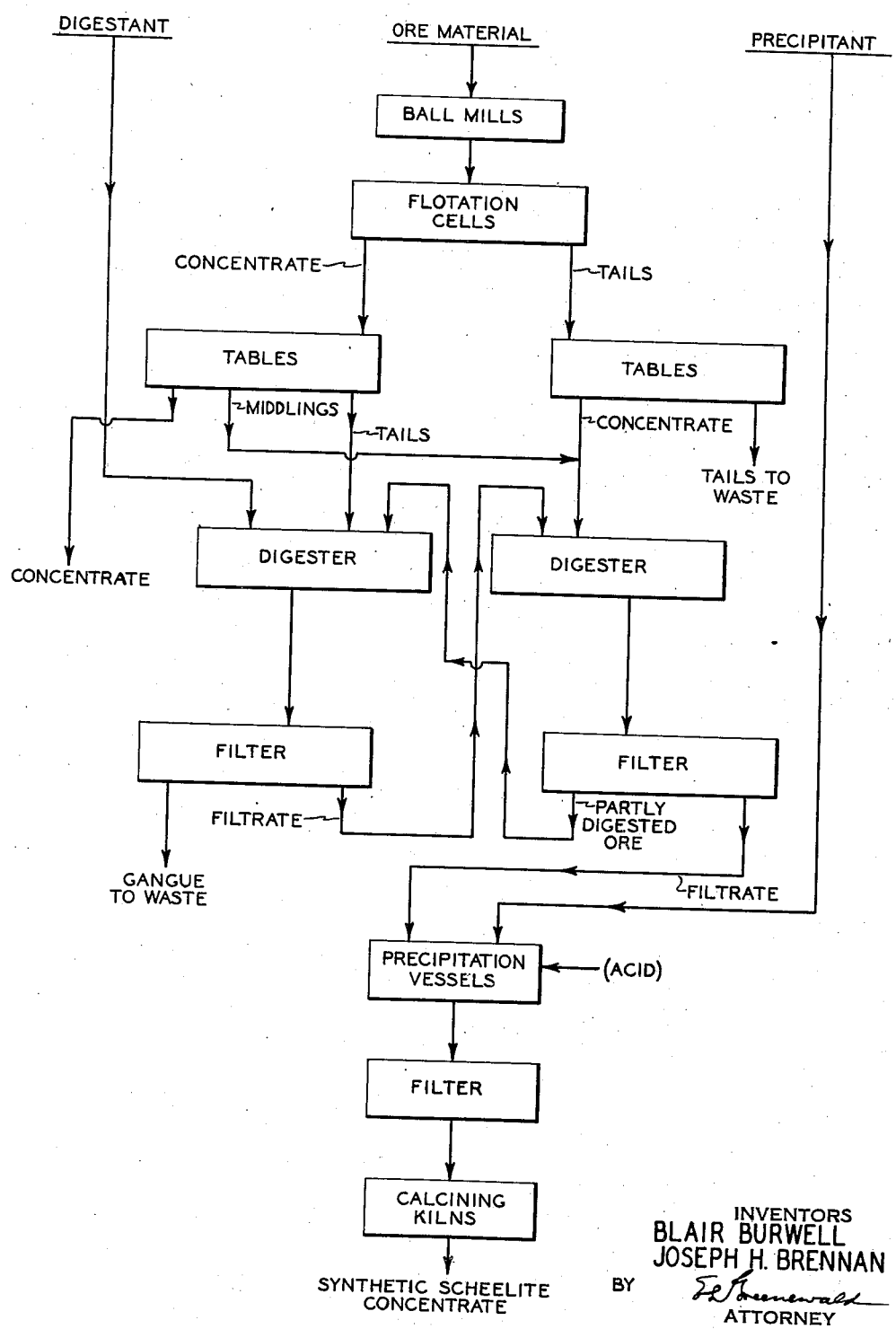

2,459,868

UNITED STATES PATENT OFFICE 2,459,868

METHOD FOR RECOVERING TUNGSTEN VALUES FROM ORE

Blair Burwell, Grand Junction, Colo., and Joseph H. Brennan, Niagara Falls, N. Y., assignors to United States Vanadium Corporation, a corporation of Delaware Application August 14, 1942, Serial No. 454,762

6 Claims. (Cl. 23—24)

The invention relates to the treatment of tungsten ore materials to produce a tungsten-rich concentrate. It has for its principal object an efficient, economical method of recovering tungsten from low grade ores of that metal. Although the invention is applicable to the treatment of tungsten ores in general, for conciseness it will be described with particular reference to the treatment of scheelite ores.

There exist in this and other countries large deposits of scheelite, but the ore usually contains many impurities and is generally of a low grade. Moreover, the ore is of the type that is not amenable to efficient mechanical separation of tungsten from gangue. For instance, although concentrates having a high percentage of tungsten have been produced by mechanical methods of concentration, the recovery of tungsten from the ore by these methods has been as low as 30% and is usually about 55% of the valuable metal in the ore. Chemical methods of separating tungsten from worthless materials in scheelite, including digestion of the ore with sodium carbonate at superatmospheric pressure and elevated temperature, have been proposed, but such methods have been conducted only as small scale, batch-type operations. Batch operations are wasteful of time and money, and the cost of the tungsten produced has been high.

As a consequence of these difficulties, domestic scheelite has been only a minor source of supply of the tungsten used in this country, chief reliance for tungsten having been placed on foreign sources. Improvement is therefore sought in methods of treating domestic ores to recover tungsten efficiently and economically.

The present invention provides an efficient, economical method for treating low-grade tungsten ores to recover a tungsten concentrate therefrom, which method is free of the difficulties encountered in hitherto known processes for treating such ore and which leads to a high recovery of the valuable metal. The invention is a process combining mechanical and chemical treatment and comprises the following steps:

(A) Mechanically concentrating the ore material and preferably classifying it into rich portions, lean portions, and waste material in a plurality of successive operations;

(B) Digesting, preferably in a plurality of operations, the concentrated material from step (A) with a digestant that dissolves only a portion of the ore material to form a metal-containing liquor and a residue; and (C) Treating the metal-containing liquor from step (B) to form a synthetic, high-grade scheelite.

Preferably, the digestion step (B) is conducted in counter-current fashion, the rich portions obtained from the classification step (A) being digested with liquor obtained from a later digestion stage, whereas the lean portions obtained from the classification step (A) together with residue obtained from an earlier digestion stage are digested with fresh digestant in said later digestion stage.

The process of the invention will be explained with reference to the accompanying flowsheet, constituting the single figure of the drawing.

Ore which is to be treated in accordance with the invention is finely ground, suitably in a ball mill, to pass at least a 65 mesh screen (0.2 mm. openings) and preferably to pass 80 mesh (0.175 mm. openings). If the ore contains sulfide minerals, for example of copper or molybdenum, these may be removed by a preliminary flotation step. The finely ground ore, or the residue from the sulfide flotation step, is then fed to a flotation cell in which a separation of desired metal from gangue is obtained by floating and removing one or the other. Preferably a flotation machine having a plurality of cells of the mechanically agitated type is used, and the tungsten-containing material is floated. A flotation agent suitable for this operation is a mixture of cresylic acid, sodium silicate and saponified cottonseed oil.

The flotation step produces a concentrate containing substantially all of the tungsten originally present in the ore, but the concentrate is of a low grade. If the above-mentioned flotation agent is used, the tungsten values are floated. Thus, although flotation alone gives a high recovery of metal from ore, it does not yield the high-grade product demanded by industry. In the method of the present invention, therefore, the flotation concentrate is subjected to chemical treatment to eliminate impurities not eliminated by the flotation step and to produce a high-grade tungsten concentrate, preferably in the form of a calcium tungstate, which may be considered and further treated as synthetic scheelite.

In this chemical treatment, the mechanically concentrated ore material is digested, preferably at elevated temperature and pressure with a digestant that dissolves or reacts with a part of the ore material to form a liquor and an insoluble residue. In the treatment of scheelite it is preferred that an alkaline solution, for example a solution of an alkali metal hydroxide or carbonate, be used as the digestant. Such materials react with the ore to form a liquor containing tungsten, leaving impurities as a residue. Ordinarily the most satisfactory digestant for scheelite is a sodium carbonate solution, using an excess of solution over that theoretically required for the reaction:

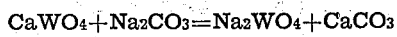
$$CaWO_4 + Na_2CO_3 = Na_2WO_4 + CaCO_3$$

After the digestion of the ore material is complete, the solution is treated to re-form calcium tungstate. The excess alkali is neutralized by the addition of a mineral acid, for example hydrochloric acid or sulfuric acid, and a calcium compound, suitably lime, calcium hydroxide, or calcium chloride is added to precipitate calcium tungstate. The calcium tungstate (synthetic scheelite) is recovered by filtration, calcined, and packed for shipment or further treatment.

The combination of mechanical and chemical treatments in the methods of the invention produces results far superior to those obtained by either mechanical or chemical treatment alone. Thus, mechanical treatment alone either results in poor recovery of a high-grade concentrate or good recovery of a low-grade concentrate, and the chemical treatments heretofore proposed have been equally inefficient and unsatisfactory. By combining mechanical and chemical treatments in the method of the invention there is provided a process for producing high-grade concentrates with high recovery of valuable metal from the ore treated. The flotation step recovers at least a major portion of the tungsten in the ore but yields a low-grade product which may be contaminated with impurities such as copper, tin and phosphorous. The chemical step removes these impurities without further loss of tungsten, and the combination of steps results in the production of a high-grade synthetic scheelite with about 90% recovery of tungsten from the ore treated.

For the greatest degree of efficiency the process of the invention is operated on a continuous basis with countercurrent digestion stages. A method of continuous operation will be discussed with reference to the accompanying flow sheet.

As stated, the flotation step in the process of the invention produces a tungsten concentrate containing most of the tungsten in the ore. There is also produced in the flotation step a lean portion, the tails or tailings, containing only a very little tungsten. As indicated in the flow sheet, in the continuous operation of the method of the invention both the concentrate and the tailings from the flotation step may be subjected to further mechanical classification. Thus, the concentrate is passed over a jigging table to effect a separation into a rich portion and a lean portion both of which are retained. The tails are similarly passed over another jigging table to effect a separation into a rich portion and a lean portion; the lean portion from this step may be discarded. Preferably, a series of tables is used to make certain that substantially all of the valuable metal is retained in the concentrates obtained from the tabling operations. On occasion it may be desirable to separate the flotation concentrate into three portions, a concentrate, middlings, and tailings. By this step a fairly high-grade concentrate of natural scheelite may be recovered and only the middlings and tailings need be put through the digestion stages.

After the ore material has been concentrated and classified, it is delivered to digester vessels for digestion which is conducted in countercurrent stages. As shown in the flow sheet, in one stage the tails derived from the tabling of the flotation concentrate and a residue of partly digested ore material recovered from another digestion stage are digested with fresh digestant. Preferably, the materials to be digested are mixed with the digestant to form a slurry before they are fed to the digester vessel, and steam at superatmospheric pressure is injected into the vessel in admixture with the slurry to raise the temperature and pressure in the vessel. Digestion is carried on in the digester vessel for a time sufficient to allow the desired reaction to be substantially completed, and the material is discharged from the digesters, cooled to a temperature below the boiling point of the digestant to reduce the pressure, and filtered. The undissolved residue which is separated from the liquor by filtration may be wasted or redigested depending on the metal values contained in it. The filtrate is preserved for use in a second digestion stage now to be discussed.

In a second digestion stage, the concentrate (or the middlings if a concentrate of natural scheelite has been recovered as explained above) derived from the tabling of the flotation concentrate and the concentrate derived from the tabling of the tails from flotation are mixed with the filtrate recovered from the digestion stage just discussed to form a slurry which is fed into another digester vessel. As in the first-mentioned digestion stage, digestion is preferably conducted at elevated temperature and pressure and is continued for a time sufficient to permit the desired reaction to go substantially to completion. The material is then discharged from the vessel, cooled, and filtered to separate the liquor from residue. The residue (partly digested ore material) is retained and is delivered to the first-discussed digestion stage to be redigested. The filtrate is rich in tungsten. It is delivered to a recovery process in which tungsten is recovered as a synthetic scheelite substantially free from undesirable impurities.

In the recovery process the filtrate is fed to suitable vessels into which may be added a mineral acid to neutralize excess carbonate, and after neutralization, a calcium compound such as lime to precipitate calcium tungstate. The precipitated calcium tungstate is recovered by filtration and is calcined in suitable ovens or kilns.

The process of the invention has been tested in large scale operation on a commercial basis and has proved to be entirely satisfactory, producing a high-grade tungsten concentrate from low-grade ores with high recovery. As an example of the operation of the process, the following is given.

In one period of operation 29,238 tons of ore containing 0.437% $WO_3$ were concentrated. The ore was ground in ball mills to pass a 65 mesh screen, passed to flotation cells and subjected to a flotation treatment with pine oil to separate sulfide minerals from it. The sulfide-free ore was then passed to a second bank of flotation cells. In these cells the tungsten mineral was floated using a flotation agent containing about 1.7 pounds of sodium silicate, 0.105 pound of cresylic acid and 0.605 pound of saponified cottonseed oil per ton of ore treated.

The flotation concentrate and tailings were separated on tables. The concentrate was split into three portions, concentrate, middlings and tailings, by tabling, the concentrate being recovered separately as a substantially finished product. A total of 73,729 pounds of a natural scheelite concentrate containing 71.57% $WO_3$ was recovered at this point. The middlings and tailings derived from tabling the flotation concentrate and the concentrate derived from tabling the flotation tails were then fed to digester vessels.

Digestion was conducted in countercurrent fashion in a plurality of digester vessels as described above in detail and shown in the flow sheet. A slurry of ore plup and sodium carbonate was made, using about 570% of the amount of sodium carbonate theoretically required to combine with all of the tungsten in the ore to form normal sodium tungstate. An average sample of all the ore fed to the digester vessels contained 6.31% $WO_3$. The slurry, containing about 59.5% solids was continuously digested at a steam presure of about 200 pounds per square inch.

The digestion step produced a liquor containing sodium tungstate, leaving a residue of undissolved material which was removed by filtration. After filtration the liquor was neutralized by the addition of sulfuric acid, acid being added until liberation of carbon dioxide was complete. Burnt lime was then added to the solution to precipitate calcium tungstate which was separated from the solution by filtration and calcined.

A total of 262,040 pounds of a synthetic scheelite concentrate was produced. The concentrate contained 66.26% $WO_3$, 0.23% sulfur, and 0.025% phosphorus. The overall tungsten recovery was 88.6%. The mill tailings contained about 0.02% $WO_3$.

The digestion stages in the process of the invention are preferably conducted in the digester vessels described in the copending application of Blair Burwell, Serial No. 425,367, filed January 1, 1942, now forfeited. The vessels described in that application are adapted to the continuous digestion of ore materials, being equipped with continuous feeding and discharging means. The use of these digester vessels in the chemical part of the process of the invention, and the use in the mechanical part of the process of a plurality of multi-cell flotation machines and a plurality of jigging tables make possible a continuous flow of ore material through the process and a continuous delivery from it of a high-grade tungsten concentrate. The continuous nature of the process adds to its efficiency, making possible the treatment of large quantities of ore at low cost compared with the cost of batch treatment. The invention thus provides a method for treating low grade tungsten ores such as dometic scheelite, ferberite, hübnerite, and wolframite, to recover valuable metal therefrom at low cost, and thereby provides an increased domestic supply of tungsten.

Although the process of the invention has been discussed in detail with reference to the treatment of a particular ore, it is not limited either to such details or to the treatment of that ore. Modifications of the process may be desirable or even necessary for the treatment of other ores, but such modifications are within the scope of the invention. For example, under some conditions with some ores it is possible to eliminate the tabling step before the digestion step.

We claim:

1. A method of treating a tungsten ore material to recover a tungsten compound therefrom, which method comprises mechanically concentrating said ore material, thereby recovering a major portion of the tungsten in the material treated as a low-grade concentrate; digesting the concentrate so produced in a plurality of countercurrent digestion stages, thereby forming a tungsten-containing liquor and a residue of impurities, and recovering calcium tungstate substantially free of undesirable impurities from said tungsten-containing liquor.

2. A method of treating an impure scheelite ore material to recover a tungsten compound therefrom, which method comprises mechanically classifying said ore material into a portion rich in tungsten and a portion poor in tungsten, digesting both of said portions in a plurality of countercurrent digestion stages, thereby forming a tungsten-containing liquor, and a residue of impurities, and recovering from said tungsten-containing liquor a tungstate substantially free from impurities.

3. A method of treating an impure scheelite ore material to recover a tungsten compound therefrom, which method comprises concentrating such ore by flotation, thereby recovering at least a major portion of the tungsten in the ore in the form of a low-grade, impure concentrate; mechanically classifying the concentrate so produced into rich portions and lean portions; digesting in countercurrent stages said rich portions and said lean portions with an alkaline solution that selectively takes tungsten into solution, thereby producing a tungsten-containing liquor and a residue; and adding a calcium compound to said liquor, thereby precipating recover from said liquor calcium tungstate substantially free from undesirable impurities.

4. A method of treating a tungsten ore material to recover a tungsten compound therefrom, which method comprises concentrating such ore by flotation, thereby recovering at least a major portion of tungsten in the ore in the form of a low-grade, impure concentrate, mechanically classifying said concentrate into a high-grade natural concentrate and lower-grade material and digesting in a plurality of countercurrent stages said lower-grade material with an alkaline solution that selectively takes tungsten into solution thereby producing a tungsten-containing liquor and a residue, and adding a calcium compound to said liquor to recover from said liquor calcium tungstate substantially free from undesirable impurities.

5. A method of treating a tungsten ore material to recover tungsten as calcium tungstate therefrom, which method comprises separating said ore material by flotation into a tungsten-rich portion and a tungsten-poor portion; separately tabling both said tungsten-rich portion and said tungsten-poor portion, thereby recovering from said tungsten-rich portion a high-grade tungsten concentrate, a middling-grade tungsten concentrate, and a tailing-grade tungsten concentrate and from said tungsten-poor portion a low-grade tungsten concentrate and gangue; digesting said middling-grade, tailing-grade, and low-grade tungsten concentrates with an alkaline digestant in a plurality of countercurrent stages, said middling-grade tungsten concentrate and said low-grade tungsten concentrate being digested in a first digestion stage with digestant recovered from a second digestion stage, thereby recovering from said first digestion stage a tungsten-containing liquor and partly digested ore material, and said tailing-grade tungsten concentrate and said partly digested ore material being digested in a second digestion stage with fresh digestant, thereby recovering from said second digestion stage digestant and a residue of insoluble material; and adding a calcium compound to said tungsten-containing liquor, thereby precipitating calcium tungstate therefrom.

6. A method of treating a scheelite ore material to recover tungsten as calcium tungstate therefrom, which method comprises separating said ore material by flotation into a tungsten-rich portion and a tungsten-poor portion; separately tabling both said tungsten-rich portion and said tungsten-poor portion, thereby recovering from said tungsten-rich portion a high-grade tungsten concentrate, a middling-grade tungsten concentrate, and a tailing-grade tungsten concentrate and from said tungsten-poor portion a low-grade tungsten concentrate and gangue; digesting said middling-grade, tailing-grade, and low-grade tungsten concentrates with sodium carbonate at superatmospheric pressure and elevated temperature in a plurality of countercurrent stages, said middling-grade tungsten concentrate and said low-grade tungsten concentrate being digested in a first digestion stage with digestant recovered from a second digestion stage, thereby recovering from said first digestion stage a tungsten-containing liquor and partly digested ore material, and said tailing-grade tungsten concentrate and said partly digested ore material being digested in a second digestion stage with fresh digestant, thereby recovering from said second stage digestant and a residue of insoluble material; and adding a calcium compound to said tungsten-containing liquor thereby precipitating calcium tungstate therefrom.

BLAIR BURWELL.
JOSEPH H. BRENNAN.

REFERENCES CITED

The following references are of record in the file of this patent:

UNITED STATES PATENTS

| Number | Name | Date |
|---|---|---|
| 1,261,383 | Hamilton | Apr. 22, 1918 |
| 1,293,404 | Giles et al. | Feb. 4, 1919 |
| 1,335,277 | Golyer et al. | Mar. 30, 1920 |
| 1,388,857 | Giles et al. | Aug. 30, 1921 |
| 1,796,026 | Iredell | Mar. 10, 1931 |
| 2,273,930 | Brown | Feb. 24, 1942 |
| 2,285,394 | Coke | June 9, 1942 |

OTHER REFERENCES

"Mineral Industry," 1939, page 673.

Certificate of Correction

Patent No. 2,459,868. January 25, 1949.

BLAIR BURWELL ET AL.

It is hereby certified that errors appear in the printed specification of the above numbered patent requiring correction as follows:

Column 3, line 36, for "phosphorous" read *phosphorus*; column 5, line 11, for "plup" read *pulp*; line 57, for "dometic" read *domestic*; column 6, line 33, claim 3, strike out the word "recover";

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*